(12) United States Patent
Keckler et al.

(10) Patent No.: US 8,307,116 B2
(45) Date of Patent: Nov. 6, 2012

(54) SCALABLE BUS-BASED ON-CHIP INTERCONNECTION NETWORKS

(75) Inventors: Stephen W. Keckler, Austin, TX (US); Boris Grot, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 573 days.

(21) Appl. No.: 12/487,781

(22) Filed: Jun. 19, 2009

(65) Prior Publication Data

US 2010/0325308 A1 Dec. 23, 2010

(51) Int. Cl.
*G06F 15/173* (2006.01)
(52) U.S. Cl. .......... 709/238; 712/11; 712/220; 370/389
(58) Field of Classification Search .......... 709/238; 712/11, 220; 370/389
See application file for complete search history.

(56) References Cited

U.S. PATENT DOCUMENTS

| | | | |
|---|---|---|---|
| 6,041,049 A | 3/2000 | Brady | |
| 6,295,294 B1 * | 9/2001 | Odlyzko | 370/389 |
| 6,567,856 B1 * | 5/2003 | Steele et al. | 709/238 |
| 6,658,478 B1 * | 12/2003 | Singhal et al. | 709/232 |
| 7,486,619 B2 * | 2/2009 | Chen et al. | 370/235 |
| 7,694,064 B2 * | 4/2010 | Shaw et al. | 710/317 |
| 2006/0282648 A1 * | 12/2006 | Denéroff et al. | 712/11 |
| 2011/0107067 A1 * | 5/2011 | Babaian et al. | 712/220 |

FOREIGN PATENT DOCUMENTS

WO WO-02/13033 2/2002

OTHER PUBLICATIONS

IBM Technical Disclosure Bulletin, TDB-ACC-No. NN8906337, Jun. 1989.*
Grot et al. "Express Cube Topologies for on-chip interconnects", 15th International Symposium on High-Performance Computer Architecture, 20080805-20080808.*
"International Search Report dated Oct. 5, 2010 regarding Application No. PCT/US2010/038320".
Balfour, James et al., "Design Tradeoffs for Tiled CMP On-Chip Networks", Int'l Conference on Supercomputing, pp. 187-198, 2006.
Grot, Boris et al., "Scalable On-Chip Interconnect Topologies", 2$^{nd}$ workshop on Chip Multiprocessor Memory Systems and Interconnects, 11 pgs., 2008.
Kim, John et al., "Flattened Butterfly Topology for On-Chip Networks", Int'l Symposium on Microarchitecture, pp. 172-182, 2007.
Scott, Steve et al., "The Black Widow High-Radix Clos Network", Int'l Symposium on Computer Architecture, pp. 16-28, 2006.

* cited by examiner

*Primary Examiner* — Moustafa M Meky
*Assistant Examiner* — Michael C Lai
(74) *Attorney, Agent, or Firm* — Dorsey & Whitney LLP

(57) ABSTRACT

The present disclosure generally relates to systems for routing data across a multinodal network. Example systems include a multinodal array having a plurality of nodes and a plurality of physical communication channels connecting the nodes. At least one of the physical communication channels may be configured to route data from a first node to two or more other destination nodes of the plurality of nodes. The present disclosure also generally relates to methods for routing data across a multinodal network and computer accessible mediums having stored thereon computer executable instructions for performing techniques for routing data across a multinodal network.

15 Claims, 10 Drawing Sheets

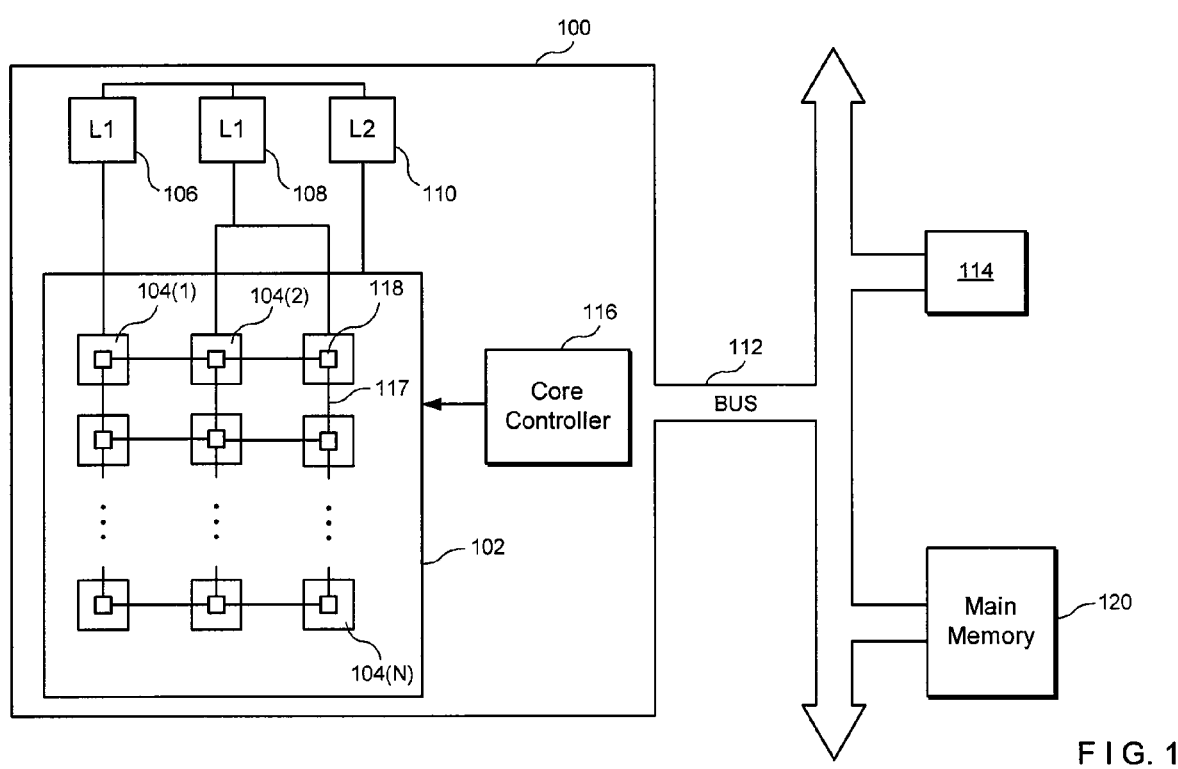
F I G. 1

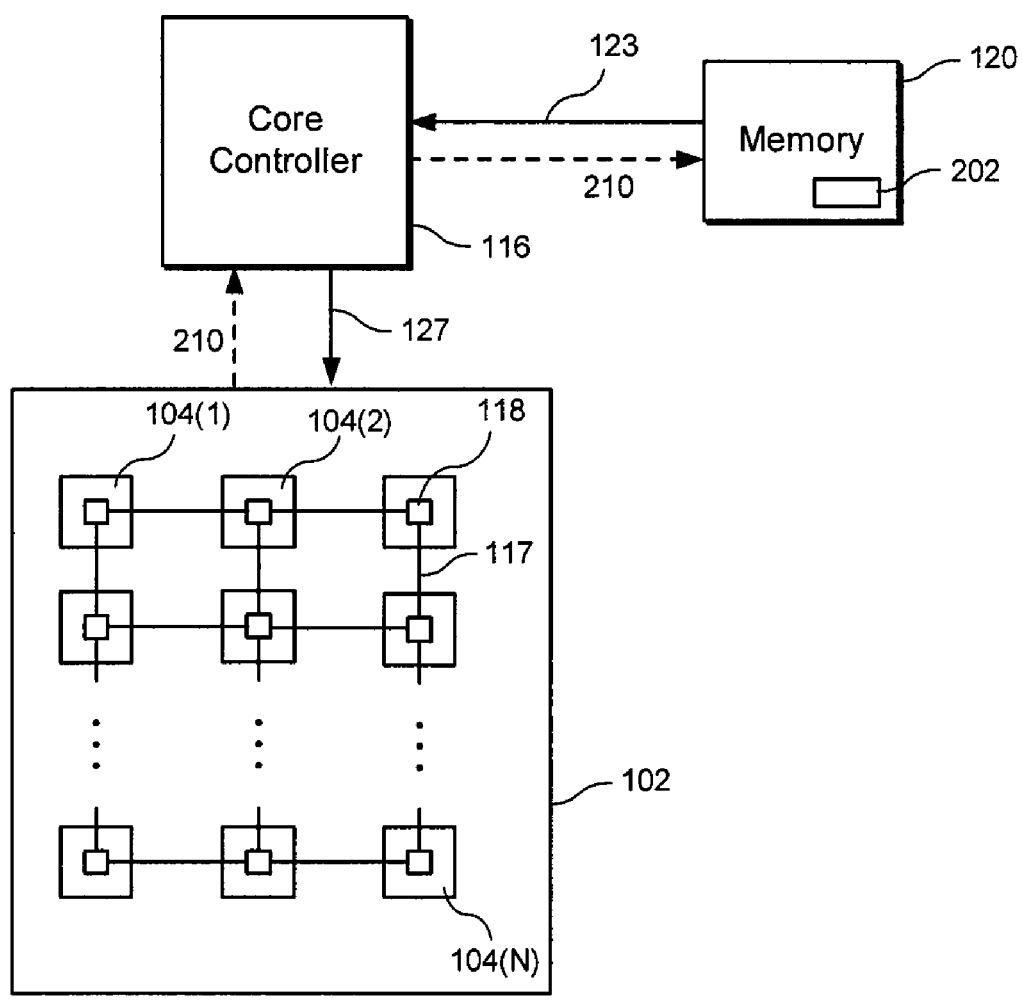
F I G. 2

SCALABLE BUS-BASED ON-CHIP INTERCONNECTION NETWORKS

STATEMENT REGARDING GOVERNMENT SPONSORED RESEARCH

This invention was made with government support under MDA972-03-C-4106 awarded by the Defense Advanced Research Projects Agency. The government has certain rights in the invention.

BACKGROUND

Multinodal processing architectures have emerged as the leading replacement to complex systems of networked uniprocessors. Examples of these architectures include single-chip multiprocessors and systems on a chip, in which multiple processing nodes are fabricated on a single integrated circuit. An on-chip network with multiple communication sources is often used to interconnect the individual nodes. In accordance with Moore's law, the node count of chip multiprocessors is expected to grow from dozens to hundreds in the near future. However, existing interconnection networks are not easily scalable, and generally do not efficiently accommodate larger multinodal processing architectures.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is a schematic of an illustrative example of a multinodal processing network, in accordance with the present disclosure.

FIG. 2 is a block diagram of an illustrative example of a multinodal processing network, in accordance with the present disclosure.

DETAILED DESCRIPTION

Figure 3:
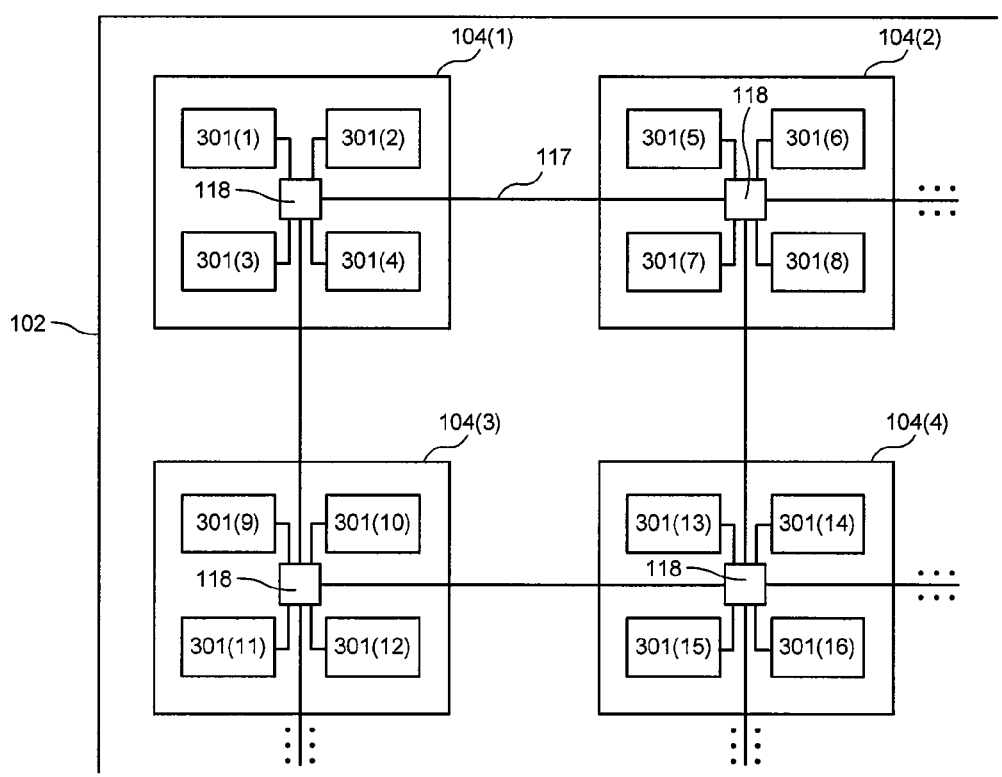
FIG. 3 is a block diagram of a multinodal array architecture, in accordance with the present disclosure.

The figures include numbering to designate illustrated components of the examples shown within the drawings, including the following: multinodal processing arrangement 100; processing node array 102; processing nodes 104(1) to 104(N); resource dedicated to a single processing node 106; resource dedicated to any subset of the processing nodes 108; external bus 112; external component 114; main memory 120; data 202, 409, 501; data request 210; core/node controller 116; data bus 123; communication channels 117, 801, 805, 807, 809, 811; connection 127; subnodes 301; point-to-point communication channels 401, 403, 411; shared communication channels 405, 507, 509; routing devices 118; point-to-point communication channel 407; rows of communication channels 303; horizontal dimension 505; vertical dimension 503; node processor 617; splitters 601; inputs from splitters 603; outputs 618, 615, 616, 620; multicast data packet 609; broadcast data packet 607; X-coordinate field of splitter 602; Y-coordinate field of splitter 604; client input 619; client output 616; input channels 701 to 711; data buffers 729 to 739; multiplexer on east (E) facing side 721 of the node; multiplexer on west (W) facing side 723 of the node; multiplexer on north (N) facing side 725 of the node; multiplexer on south (S) facing side 727 of the node; output channels 713 to 719; crossbar switch 730; step 902; step 904; computer system 1007; processor 1005; step 1001; step 1003; basic configuration 1101; computing device 1100; system memory 1120; processors 1110; memory bus 1130; level one cache 1111; level two cache 1112; registers 1114; memory controller 1115; node/core controller 1129; multinodal processing array 1113; operating system 1121; applications 1122; program data 1124; dashed line 1101; data storage devices 1150; bus/interface controller 1140; storage interface bus 1141; removable storage devices 1151; non-removable storage devices 1152; interface bus 1142; output devices 1160; graphics processing unit 1161; peripheral interfaces 1170; interface controller 1171; parallel interface controller 1172; I/O ports 1173; communication device 1180; network controller 1181; computing devices 1190; shared channels 510, 512, 514.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein. Additionally, some well-known structures, circuits, techniques, and the like have not been described in detail, to avoid unnecessarily obscuring the disclosure.

In multinodal processing, data may be distributed to particular processing nodes as the data is read from memory, external sensors, or other components of the computing environment, such as but not limited to, input-output (I/O) devices or other components coupled to the Central Processing Unit (CPU) by buses. Data to be processed may be distributed to the processing nodes in a number of ways, such as, e.g., through an on-chip interconnection network on a single-chip multiprocessor.

Multinodal processors using existing interconnection topologies at times may not efficiently route data between the various processing nodes. For example, data may pass through a number of intermediate routing devices rather than flowing directly over a single communication channel. Each such device may cause the data to "hop" between one point-to-point network connection and another. For example, many existing topologies provide that a data packet take several hops as it is routed between a starting node and a destination node, which wastes energy and produces high router latency. Other existing topologies use a large number of dedicated point-to point links in an effort to reduce the hop count and minimize overall router delay in the network. However, these topologies may not be easily scalable, and may lead to a low channel utilization.

In order to increase the efficiency and scalability of multinodal processing networks, examples of systems and methods are described herein for a multinodal processing network architecture that may efficiently route data across an array of processing nodes. The examples of the systems and methods described herein may include multiple communication channels which may couple the processing nodes configured to route data to two or more destination nodes. Additionally, the nodes and the communication channels of the multinodal processing network may be arranged in various configurations, e.g., to improve the efficiency of the network. For example, the network may be concentrated, e.g., so that nodes in the array may include a group of subnodes that may be configured to share a routing device. Examples of these configurations, as well as other configurations, will be discussed in detail below.

FIG. 1 is a schematic of an illustrative example of a multinodal processing network 100, arranged in accordance with the present disclosure. Network 100 includes a single integrated circuit having a processing node array 102. In other examples, a multinodal processor may include processors on separate integrated chips. The processing node array 102 may include a particular number (N) of processing nodes 104(1) to 104(N). Any suitable number (N) of processing nodes 104 may be provided. Each processing node 104(1) to 104(N) may generally be of any desired configuration including but not limited to a microprocessor (µP), a microcontroller (µC), a digital signal processor (DSP), etc., or any combination thereof. Thus, each processing node 104(1) to 104(N) may include logic for executing program or software instructions, as well as other functional blocks, such as, e.g., an arithmetic logic unit (ALU), a floating point unit (FPU), a digital signal processing (DSP) node, registers, accumulators, etc.

The multinodal processor 100 may include any combination of dedicated or shared resources. A dedicated resource may be, e.g., a resource 106 dedicated to a single processing node 104, such as a dedicated level one cache, and/or may be a resource 108 dedicated to any subset of the processing nodes 104. A shared resource may be, e.g., a resource 110 shared by all of the nodes 104(1) to 104(N), such as a shared level two cache and/or a shared external bus 112 supporting an interface between the multinodal processor 100 and another component 114 (such as, but not limited to, input-output (I/O) devices, external sensors, or the like, or may be a resource shared by any subset of the processing nodes 104). A shared resource may also include main memory 120, which may be any suitable form of memory including, but not limited to, e.g., volatile memory such as random access memory (RAM), non-volatile memory such as read only memory (ROM) or flash memory storage, data storage devices such as magnetic disk storage (e.g., hard disk drive or HDD), tape storage, optical storage (e.g., compact disk or CD, digital versatile disk or DVD), or other machine-readable storage mediums and/or computer-accessible mediums that may be removable, non-removable, volatile or non-volatile.

The multinodal processor 100 may have any suitable number of processing nodes 104(1) to 104(N). For example, the multinodal processor 100 may have two (2) nodes, four (4) nodes, tens of nodes, and even hundreds or more of processing nodes. Some examples of the multinodal processors may be homogeneous, such that each of the processing nodes use a single node design. Other examples of the multinodal processors may be heterogeneous, such that one or more of the processing nodes may be different from one or more of other processing nodes, and/or each node or subset of nodes may be optimized for a different role in the multinodal processor 100.

The multinodal processor 100 may also include a core/node controller or a core/node interface 116. The core/node controller 116 may determine which processing tasks are to be processed by each processing node 104(1) to 104(N). One or more routing functions or devices, such as a router, switch or a combination of routers and switches 118 may also be provided to route data between the individual nodes 104(1) to 104(N). In one example, the processing tasks may be routed to selected processing nodes using the routers 118.

FIG. 1 is an illustrative block diagram of an example of the multinodal processor 100 and does not illustrate the physical location of the components illustrated therein. It is appreciated that the multinodal processor 100 described herein is illustrative and that variations and modifications are possible. Design choices may be driven by, for example, considerations of hardware size and complexity versus performance, thermal energy and heat dissipation, processor speed, overall throughput, etc.

As may be appreciated by one skilled in the art having read the present disclosure, the multinodal processor 100 may be provided in a suitable computing environment, such as a personal computer (PC). The computing environment may include the multinodal processor 100, system memory, one or more buses, and one or more input/output (I/O) devices, such as a keyboard, mouse, touch screen, display device, such as a conventional CRT or LCD based monitor, universal serial bus (USB) or other port connections, CD drives, DVD drives, and the like. Bus connections among the various components may be implemented using bus protocols such as Peripheral Component Interconnect (PCI), PCI Express, Accelerated Graphics Port (AGP), or any other suitable bus protocol, and connections between different devices may use different protocols. A PC may operate in a networked environment using logical connections to one or more remote computers. Such remote computers may be, for example, other PCs, servers, routers, network PCs, peer devices, or other common network nodes. Logical connections may comprise, for example, a local-area network (LAN) or a wide-area network (WAN).

FIG. 2 is a block diagram of an illustrative example of a multinodal processing network, in accordance with the present disclosure. As is illustrated in FIG. 2, the data 202 may be gathered by the processor 100 (such as shown in FIG. 1), or by other ways and stored in memory and/or another storage arrangement 120. The stored data 202 may be retrieved from the memory or storage arrangement 120 by the core/node controller 116 when requested for processing by the multinodal processor array 102. Accordingly, a data request 210 may be sent from the multinodal processor array 102 to the memory 120 by the core/node controller 116, and the data may be sent to one or more nodes 104(1)-104(N) for processing. The data 202 may be transferred along a data bus 123 to the core/node controller 116, which may then determine which nodes 104(1)-104(N) will be processing the data 202.

In some examples, the processing nodes 104(1) to 104(N) may be fabricated or provided on an integrated circuit or chip or on the node array 102. The data 202 may be routed along a connection 127 to the routers 118. The data 202 may then be routed to selected individual processing nodes 104(1) to 104(N) using such one or more routers 118 and communication channels 117 connecting the routers 118.

The communication channels 401, 403, 405, 407 (as will be shown in FIG. 4, and described in further detail below) may be physical communication channels composed of any suitable conducting material used in semiconductor manufacturing. Generally, the type of data 202 being processed by the nodes 104(1) to 104(N) may determine the path of the data through the network of the processing nodes 104(1) to 104(N) selected for processing the tasks associated with the data.

Another example of the presently disclosed multinodal array architecture is illustrated as a block diagram in FIG. 3. As shown in FIG. 3, the nodes 104(1) to 104(N) of the processing node array 102 of the multinodal processor 100 may include two or more subnodes 301(1) to 301(16) sharing network resources 118. As discussed above, the network resources 118 may include a network interface, such as a routing device or switch that facilitates each group of subnodes 104(1), 104(2), 104(3) and 104(4) to communicate with the other groups of subnodes through the communication channels 117. A concentrated array, such as an example shown in FIG. 3, may result in a reduction of network resources, e.g., by a factor of four, which may increase the efficiency and processing speed of the overall multinodal network. Another example of a concentrated on-chip network is discussed in "Flattened Butterfly Topology for On-Chip Networks," by John Kim, James D. Balfour, and William J. Dally, IEEE Computer Architecture Letters, Vol. 6, Issue 2, pp. 37-40, the entire contents of which is herein incorporated by reference.

As illustrated in FIG. 3, the nodes 104(1) to 104(N) comprising the multinodal array may be arranged in a parallel or tiled configuration, and may also be arranged in other ways, such as in a simple ring configuration, etc.

Figure 4:
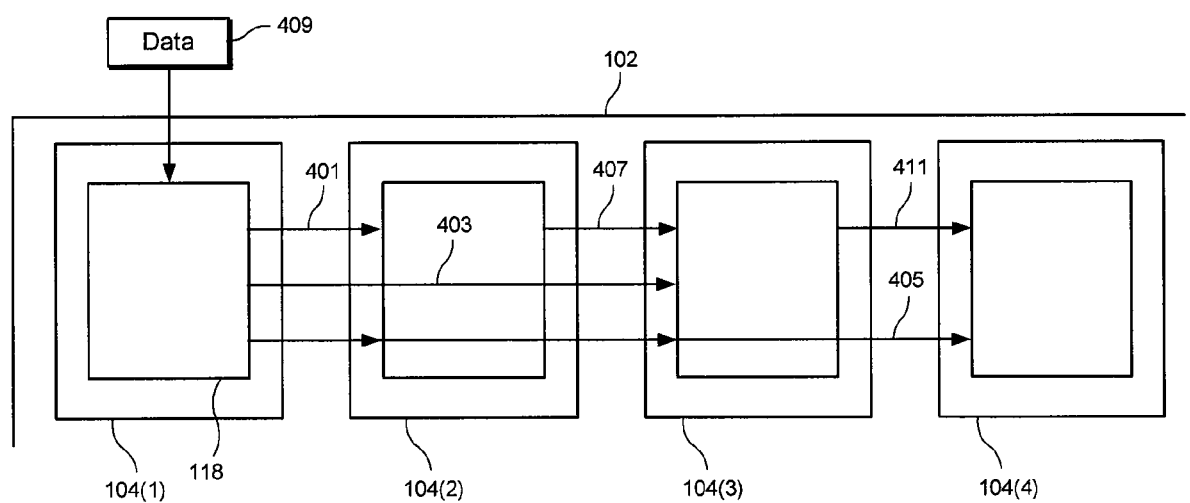
FIG. 4 is a block diagram of a multinodal array architecture, in accordance with the present disclosure.

FIG. 4 is a block diagram of a multinodal array architecture, according to the present disclosure. As shown in FIG. 4, the routers 118 of the individual nodes 104 may be linked by communication channels 401, 403, 405 of various lengths that may bisect and/or extend through and/or over the individual processing nodes 104. The communication channels may include single point-to-point communication channels 401, 407, 411 for routing the data from a starting node 104(1) or node 104(2) to a neighboring node 104(2) or node 104(3), as well as longer point-to-point channels 403 for routing data between nodes 104(1), 104(3) that are separated by the intermediate node(s) 104(2). Longer point-to-point channels 403 may serve to minimize latency in the network by reducing the number of hops required to route the data 409 through the multinodal network 104. As an example, in the multinodal array illustrated in FIG. 4, data packet 409 may be routed from starting node 104(1) to destination node 104(3) more efficiently using longer channel 403 than using short length channels 401 and 407.

In addition to point-to-point communication channels, the multinodal processing network may also include shared communication channels 405 that may function as a shared busway for routing data from a starting node 104(1) to multiple destination nodes 104(2), 104(3) and 104(4). With similar benefits as the longer point-to-point channels 403, the shared channels 405 may reduce latency by minimizing the overall hop count of the network. In addition, the point-to-point channels may greatly enhance the scalability and performance of the network by reducing the number of channels required to connect various network nodes.

Figure 5:
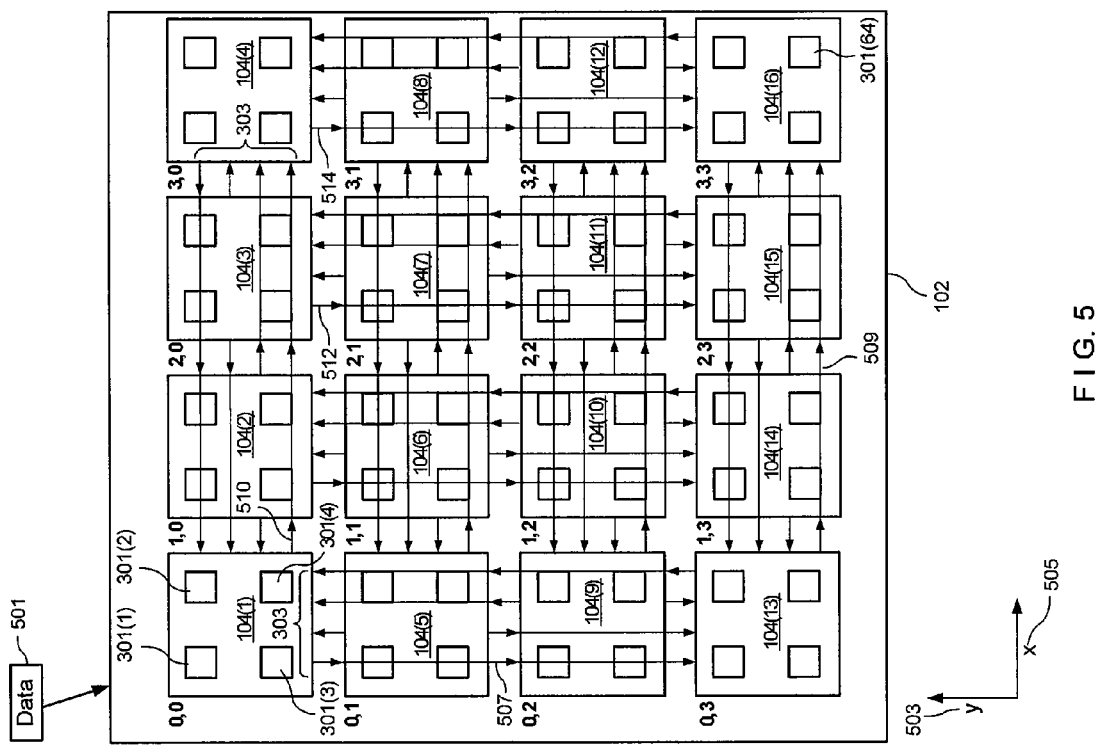
FIG. 5 is a block diagram of a multinodal array architecture, in accordance with the present disclosure.

Another example of a multinodal array architecture is illustrated as a block diagram in FIG. 5, which shows an array 102 of, e.g., sixteen (16) nodes 104(1) to 104(16) and sixty-four (64) subnodes 301 arranged on the single multinodal chip 102. In this example, the subnodes 301(1) to 301(4) may be concentrated into groups of four subnodes 301(1) to 301(4) sharing the routing device and resources 118 (as shown in FIGS. 1 to 4, and omitted in FIG. 5 for clarification purposes) for routing the data between the various node groups 104(1) to 104(N). In addition to the illustrated array arrangement as shown in FIG. 5, many other sizes and configurations of the multimodal array are possible. For example, the example array may include 256 nodes, and may use a 16-way concentration or a 4-way concentration.

The physical communication channels 303 connecting the various nodes may extend along rows of processing nodes 104(1) to 104(16) in different dimensions 503, 505, such as different directions, for example, horizontal 505, vertical 503 and diagonal directions, of the array 102, so as to form rows of physical communication channels 303 across a plurality of the nodes 104(1) to 104(16). In some examples, the rows of physical communication channels 303 may extend along rows of processing nodes 104(1) to 104(16) that are oriented in a horizontal 505 and a vertical 503 dimensions. In some other examples, the rows of communication channels 303 may extend along rows of processing nodes 104(1) to 104(16) that are oriented in a diagonal or other dimension, if so desired. The number of the rows of communication channels 303 extending along a row of processing nodes 104(1) to 104(16) in a dimension or direction 505, 503 may be, e.g., equal to the number of the processing nodes 104(1) to 104(N) in that respective row of processing nodes 104(1) to 104(16).

As an example, the array depicted in FIG. 5 has four rows of communication channels along each horizontal row 104(1) to 104(4), 104(5) to 104(8), 104(9) to 104(12), 104(13) to 104(16), and each vertical row 104(1) to 104(13), 104(2) to 104(14), 104(3) to 104(15), 104(4) to 104(16) of the node array 102. The array 102 may also contain four nodes 104 in each horizontal row, e.g., nodes 104(1) to 104(4), nodes 104(5) to 104(8), nodes 104(9) to 104(12), and nodes 104(13) to 104(16)) and in each vertical row, e.g., nodes 104(1) to 104(13), nodes 104(2) to 104(14), nodes 104(3) to 104(15), and nodes 104(4) to 104(16). In another example, the number of rows communication channels 303 extending along a row of processing nodes 104(1) to 104(16) in any dimension 505, 503 (vertical, horizontal or diagonal) of the array 102 may be equal to the number of the processing nodes 104(1) to 104(16) along that row.

In some examples, the multinodal processing array 102 may also include a combination of shared busways and/or point-to-point channels to maximize the efficiency and performance of the network. Incoming data 501 may be routed to any two nodes 104 of the array in two hops or less. For example, the data 501 may be routed from node 104(1) to node 104(16) in two hops using shared communication channels 507 and 509.

It should be noted that FIG. 5 illustrates only one possible configuration of a multinodal processing array, which may be modified to include, e.g., more or fewer nodes, subnodes and/or communication channels.

Figure 6:
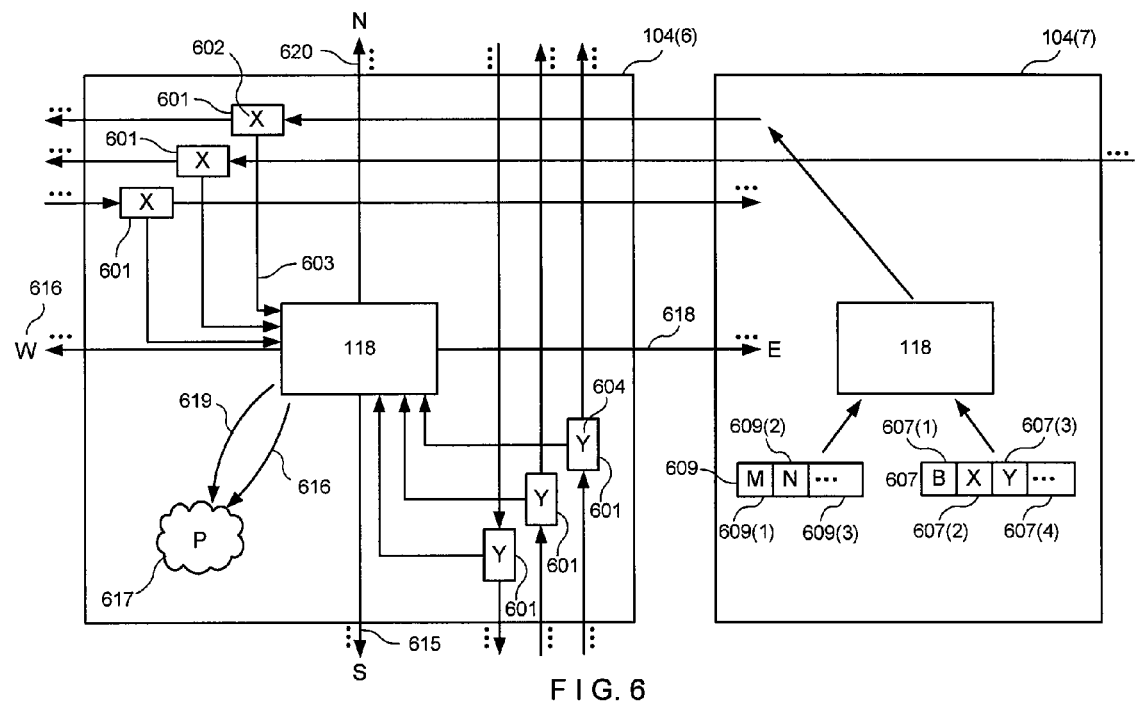
FIG. 6 is a schematic diagram of an example of a microarchitecture of a single node in a multinodal processing array, as shown in FIG. 5, in accordance with the present disclosure.

FIG. 6 is a schematic diagram of an example of a microarchitecture of a single node 104(6), in a multinodal processing array, e.g. array 102 shown in FIG. 5, in accordance with the present disclosure. The node 104(6) may have a router 118 and splitters 601(1) to 601(6). As an example, data packets 607, 609 may be routed from a source node 104(7) to a destination node 104(6) in one hop along the X-dimension 605 and one hop along the Y-dimension 603. The source node 104(7) may compose a data packet message 607, 609 containing an X-coordinate location 607(2) and a Y-coordinate location 607(3) of the destination node 104(1) to 104(N). In an example, the source node 104(7) may transmit the data packet 607, 609 into the router 118 of the node 104(6), which places the data packet 607, 609 into one of the output ports 615, 616, 618, 620 of the router 118 of the node 104(6) for distribution to other nodes 104(1) to 104(N) in the node array 102.

The destination node 104(6) may include a number of splitters 601 that may compare the X-coordinate field 607(2) of the data packet 607 to the X-coordinate field 602 of the splitter 601. In one example, if the X-coordinates do not match, then the splitter 601 will not route the data packet 607 to an input channel 603 of the router 118 of the node 104(6), and may instead route the data packet 607 to another node 104 in the array 102. In another example, if the X-coordinate field 607(2) of the data packet 607 and the X-coordinate field 602 of the splitter 601 match, then the splitter 601 may route the data packet 607 into the appropriate west (W) input channel 603. The router 118 of the node 104(6) may then read the Y-coordinate field 607(3) of the data packet 607 and compare the Y-coordinate field 607(3) of the data packet 607 and the Y-coordinate field 604 of the splitter 601. In one example, if the Y-coordinate fields 607(3) and 604 do not match, then the router 118 of the node 104(6) may transfer the data packet 607 to other nodes 104 in the array 102 using the southbound (S) output channel 615 to be compared by other routers 118 of other nodes via respective Y-splitters. In another example, if the Y-coordinate fields 607(3) and 604 match, then the router 118 may route the data packet 607 through an internal communication channel 616 to the node processor 617 in the node 104(6).

In other examples, the data packet 607 may include a broadcast bit 607(1) in the header of the packet 607 indicating that the data packet 607 may be routed to all nodes 104(1) to 104(N) in the array 102 (as shown in FIGS. 1-5). In another example, the data packet 609 may include a multicast bit 609(1) in the header of the packet 609 indicating that the data 609 may be routed to a subset of the nodes 104 in the array 102. A data packet 609 supporting multicasting may include a bitmask 609(2) that may correspond to multiple destination nodes 104(1) to 104(N) in the node array 102. As an example, the multicast data packet 609 may be multicasted from node 104(1) (having coordinate location 0,0) to destination nodes 104(7) (e.g., having coordinate location 2,1) and 104(16) (e.g., having coordinate location 3,3) in the array 102 shown in FIG. 5 in a number of ways. In one example, the source processing node 104(1) may set the bitmask 609(2) of the data packet 609 to reference the coordinates (2,1) and (3,3) of the destination nodes 104(7) and 104(16). The router 118 at the source node 104(1) may then route the data packet 609 through an eastbound (E) shared channel 510 (as shown in FIG. 5) to the nodes 104(3) and 104(4) located at the appropriate X-coordinate locations, which may deliver the message to the destination nodes 104(7) and 104(16) located at the appropriate Y-coordinate locations.

Figure 7:
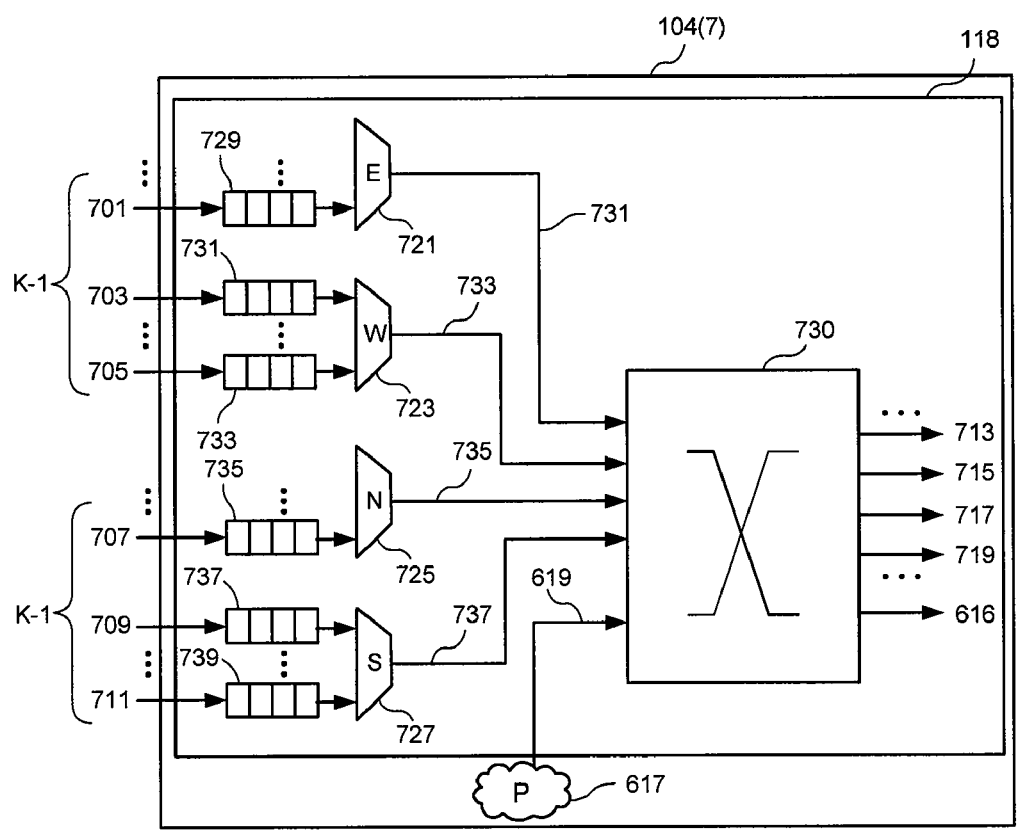
FIG. 7 is a schematic diagram of a microarchitecture of a single node in a multinodal processing network, in accordance with the present disclosure.

FIG. 7 is a schematic diagram of an example of a microarchitecture of a single node, node 104(7), in a multinodal processing array, e.g. array 102 shown in FIG. 5, in accordance with the present disclosure. In one example, incoming data packets held in data buffers 729 to 739 may be routed through input channels 701 to 711 to the router 118 or functional equivalent thereof inside the node 104(7). After being processed by the router 118, the data packets may be routed to the other nodes 104 in the node array 102 through output channels 713 to 719 extending from the node 104(7). In some examples, each node 104 may have 2(k−1) input channels 701 to 711 to route the data to the node 104(7), with k being the number of nodes in each horizontal, vertical or diagonal dimension. As illustrated in examples of FIGS. 5 and 6, the node 104(7) may have a single communication channel 701 feeding data to the east (E) facing side 721 of the node 104(7), two input channels 703, 705 feeding data to the west (W) facing side 723 of the node 104(7), one input channel routing data to the north (N) facing side 725 of the node 104(7), and two input channels 709, 711 feeding data to the south (S) facing side 727 of the node 104(7), for a total of six input channels 701 to 711. In another example, the data packets held in data buffers 729 to 739 arriving at the node input channels 701 to 711 may be multiplexed by the respective multiplexers 721 to 727 and sent through channels 731 to 737 to a crossbar switch 730, which may transfer the data to an appropriate output channel 713, 715, 717 or 719. In another example, the router 118 may also include an input channel 619 and an output channel 616 connecting the node processor 617 to the router 118.

Additionally, as shown in the example illustrated in FIG. 6, the node 104 in a parallel array configuration may have up to four output communication channels 713 to 719. In one example, the output channel may extend from the node 104 (7) in each direction (e.g., North, East, South or West).

Figure 8:
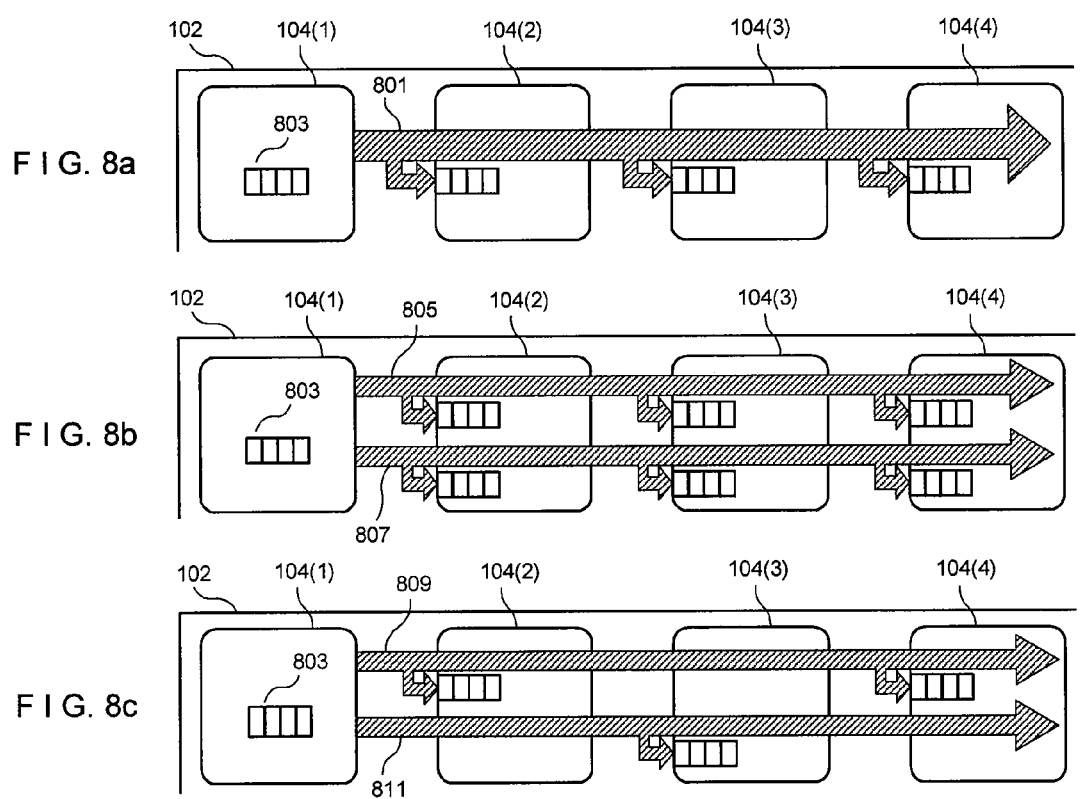
FIGS. 8a to 8c are schematic diagrams of various examples of multinodal array architectures, in accordance with the present disclosure.

FIGS. 8a to 8c are schematic diagrams of various examples of multinodal array architectures, in accordance with the present disclosure. In one example, shown in FIG. 8a, a communication channel 801 may be configured to route data 803 to multiple individual nodes 104(1) to 104(4) in the node array 102. In another example, shown in FIG. 8b, a communication channel 801 may be partitioned with two or more communication channels 805 and 807 that may each be configured to route the data to each of the nodes 104(1) to 104(4) in the node array 102. The communication channels 805 and 807 may be of the same bandwidth as the partitioned communication channel 801, but may also have smaller (or larger) bandwidths. In one example, the communication channels 805 and 807 may have approximately equal bandwidths comprising approximately equal fractions of the bandwidth of the partitioned communication channel 801. Using multiple shared channels that route the data to multiple nodes may prevent or reduce a wasted intra-channel bandwidth, which may occur if the bandwidth of a channel exceeds the size of a frequently-transmitted data packet. Splitting the channels may also prevent or reduce head-of-line blocking in buffered network systems to increase the overall efficiency of the network.

As illustrated in the example of FIG. 8c, the communication channel 801 may also be partitioned into two or more split subchannels 809 and 811 that are configured to route the data 803 to the destination nodes 104(2), 104(3) and 104(4) of the partitioned communication channel 801. The split subchannels 809, 811 may include a combination of point-to-point channels and shared communication channels. In some examples, the destination nodes 104(2), 104(3), 104(4) of the split subchannels 809, 811 may be partitioned so that the destination nodes 104(2) and 104(4) of one of the split subchannels 809 are different from the destination node(s) 104 (3) of any of the other split subchannels 811. In other examples, the number of inputs to each router 118 of the array 102 does not change when the communication channel 801 is partitioned.

Figure 9:
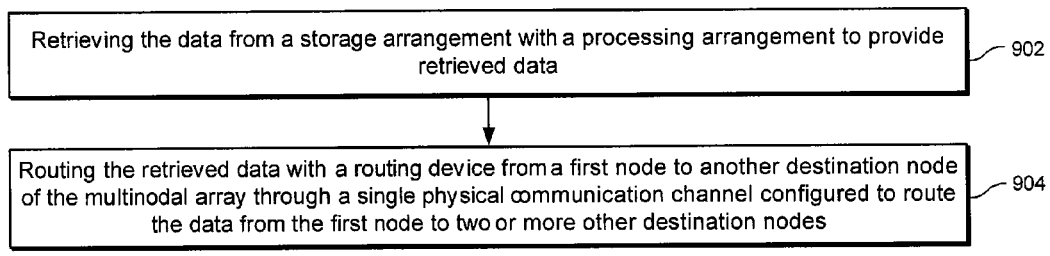
FIG. 9 is a flow diagram of an example of a method for routing data across a multinodal processing network, in accordance with the present disclosure.

FIG. 9 is a flow diagram of an example of a method for routing data across a multinodal processing network, in accordance with the present disclosure. As shown in operation 902, the data from the storage arrangement may be retrieved with a processing arrangement to provide retrieved data. In operation 904, the data retrieved from the storage may be routed with a routing device from a first processing node to at least two other destination processing nodes of a multinodal processing array through a single physical communication channel.

Figure 10:
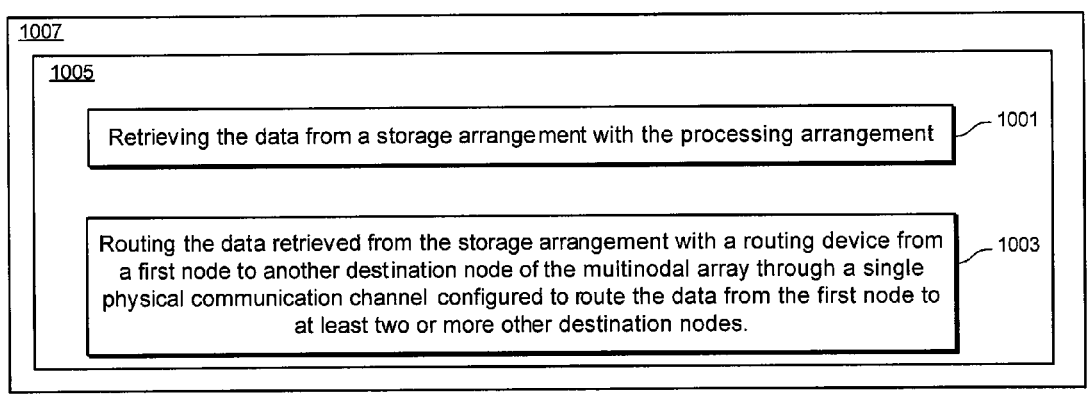
FIG. 10 is a flow diagram of another example of the method for routing data across a multinodal processing network, in accordance with the present disclosure.

FIG. 10 is a flow diagram of another example of a method for routing data across a multinodal processing network, in accordance with the present disclosure. As shown in FIG. 10, a computer system 1007 may include a processor 1005 configured for performing an example of a method for routing data across a multinodal processing network. In other examples, various steps or portions of various steps of the method may be performed outside of the processor 1005. In operation 1001, e.g., the method may include retrieving data from a storage arrangement with a processing arrangement to provide retrieved data. In operation 1003, the method may include routing the retrieved data with a routing device from a first processing node to at least two other destination processing nodes of a multinodal processing array through a single physical communication channel.

Figure 11:
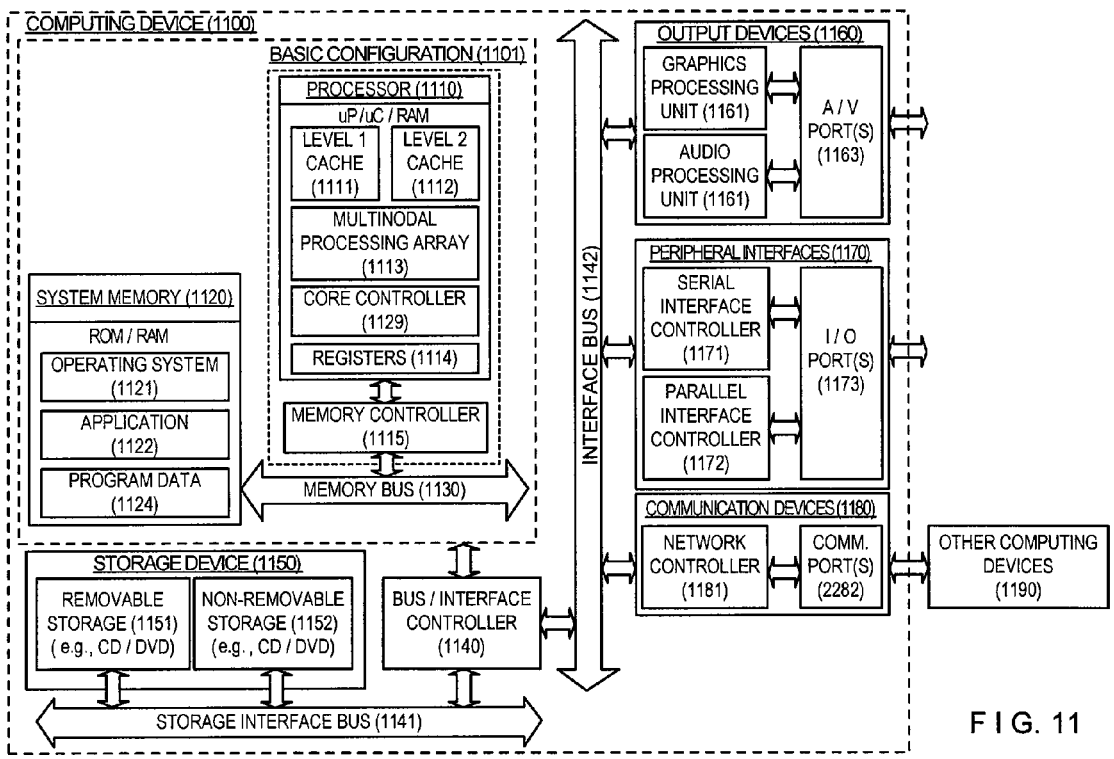
FIG. 11 is a block diagram of an example of a computing device that is arranged for routing data across a multinodal processing network.

FIG. 11 is a block diagram illustrating an example computing device 1100 that is arranged for routing data across a multinodal processing network, in accordance with the present disclosure. In a very basic configuration 1101, computing device 1100 typically includes one or more processors 1110 and system memory 1120. A memory bus 1130 can be used for communicating between the processor 1110 and the system memory 1120.

Depending on the desired configuration, processor 1110 can be of any type including but not limited to a microprocessor (µP), a microcontroller (µC), a digital signal processor (DSP), or any combination thereof. Processor 1110 can include one more levels of caching, such as a level one cache 1111 and a level two cache 1112, and registers 1114. Processor 1110 may further include a multinodal processing array 1113 that is arranged to route data across a multinodal processing network. The multinodal processing array 1113 can include an arithmetic logic unit (ALU), a floating point unit (FPU), a digital signal processing core (DSP Core), or any combination thereof. A memory controller 1115 can also be used with the processor 1110, or in some implementations the memory controller 1115 can be an internal part of the processor 1110. The processor 1110 may further comprise a node/core controller 1129 that may determine the processing tasks processed by the multinodal processing array 1113.

Depending on the desired configuration, the system memory 1120 can be of any type including but not limited to volatile memory (such as RAM), non-volatile memory (such as ROM, flash memory, etc.) or any combination thereof. System memory 1120 typically includes an operating system 1121, one or more applications 1122, and program data 1124. In some embodiments, application 1122 can be arranged to operate with program data 1124 on an operating system 1121. This described basic configuration is illustrated in FIG. 11 by those components within dashed line 1101.

Computing device 1100 can have additional features or functionality, and additional interfaces to facilitate communications between the basic configuration 1101 and any required devices and interfaces. For example, a bus/interface controller 1140 can be used to facilitate communications between the basic configuration 1101 and one or more data storage devices 1150 via a storage interface bus 1141. The data storage devices 1150 can be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include an interface bus 1142 for facilitating communication from various interface devices (e.g., output interfaces, peripheral interfaces, and communication interfaces) to the basic configuration 1101 via the bus/interface controller 1140. Example output devices 1160 include a graphics processing unit 1161 and an audio processing unit 1162, which can be configured to communicate to various external devices such as a display or speakers via one or more A/V ports 1163. Example peripheral interfaces 1170 include a serial interface controller 1171 or a parallel interface controller 1172, which can be configured to communicate with external devices such as input devices (e.g., keyboard, mouse, pen, voice input device, touch input device, etc.) or other peripheral devices (e.g., printer, scanner, etc.) via one or more I/O ports 1173. An example communication device 1180 includes a network controller 1181, which can be arranged to facilitate communications with one or more other computing devices 1190 over a network communication via one or more communication ports 1182.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

The foregoing describes various examples of how the data may be routed across a multinodal processing network. Specific examples of methods and systems for routing the data across a multinodal processing network are described below. Such examples are provided for illustration only, and are not intended to be limiting.

For example, a system for routing data across a multinodal network may comprise a multinodal array having a plurality of nodes, and a plurality of physical communication channels connecting the plurality of nodes. At least one of the plurality of physical communication channels may be configured to route the data from a first node to two or more other destination nodes of the nodes.

In other examples, each of the plurality of nodes may comprise two or more subnodes that are configured to share a routing device. In addition, the plurality of physical communication channels may extend along a first row of nodes in a first direction of the array so as to form a plurality of rows of physical communication channels, and a number of nodes from the plurality of nodes that are located along the first row may be equal to a number of rows from the plurality of rows of physical communication channels that extend along the first row between the number of nodes. In further examples, the plurality of physical communication channels may extend along a first row of nodes in a first direction of the array and along a second row of nodes in a second direction of the array so as to form a plurality of rows of physical communication channels. The first number of nodes from the plurality of nodes that are located along the first row may be equal to a number of rows from the plurality of rows of physical communication channels that extend along the first row between the first number of nodes. The second number of nodes from the plurality of nodes that are located along the second row may be equal to a number of rows from the plurality of rows of physical communication channels that extend along the second row between the second number of nodes. In other examples, the first and second directions of the array may include a horizontal direction of the array and a vertical direction of the array. In addition, each of the plurality of nodes may have two to four outputs and $2(k-1)$ inputs, where k is the number of nodes from the plurality of nodes located along a particular row of the array.

In addition, at least one of the plurality of physical communication channels may include two or more split subchannels. Each of the two or more split subchannels may be configured to route the data to the other destination nodes of the respective one of the plurality of physical communication channels. Further, the two or more split subchannels may have approximately equal bandwidths and a sum of the bandwidths of the split subchannels may be approximately equal to a bandwidth of the respective one of the plurality of physical communication channels.

In another example, at least one of the plurality of physical communication channels may include two or more split subchannels that are configured to route the data to the destination nodes of the one of the plurality of physical communication channels. At least one of the split subchannels may be configured to route the data from the first node to at least two of the destination nodes of the respective one of the physical communication channels, and the other destination nodes of any one of the split subchannels may be different from the other destination nodes of any other one of the split subchannels. Additionally, the physical communication channels may be configured to route the data from the first node to any one of the other destination nodes in at most two hops. In other examples, the system may be configured as a single-chip multi processor.

The present disclosure may also generally relate to methods for routing the data across a multinodal network. One possible example of a method for routing data across a multinodal network may comprise retrieving the data from a storage arrangement with a processing arrangement to provide retrieved data, and routing the retrieved data with a routing device from a first node to another destination node of the multinodal array through a single physical communication channel configured to route the data from the first node to two or more other destination nodes.

In other examples, each of the nodes may comprise two or more subnodes that are configured to share a routing device. In addition, the network may comprise a plurality of physical communication channels may extend along a first row of nodes in a first direction of the array so as to form a plurality of rows of physical communication channels, and a number of nodes from the plurality of nodes that are located along the first row may be equal to a number of rows from the plurality of rows of physical communication channels that extend along the first row between the number of nodes. In some examples, each of the nodes may have two to four outputs and $2(k-1)$ inputs, where k is the number of the nodes from the plurality of nodes located along a particular row of the array.

In further examples, the physical communication channel may comprise split subchannels having approximately equal bandwidths. Each of the split subchannels may be configured to route the data to the other destination nodes of the single physical communication channel. Additionally, the two or more split subchannels have approximately equal bandwidths and a sum of the bandwidths of the split subchannels may approximately equal a bandwidth of the single physical communication channel. In other examples, the single physical communication channel may comprise two or more split subchannels that may be configured to route the data to the other destination nodes of the single physical communication channel. At least one of the split subchannels may be configured to route the data from the first node to at least two of the at least two other destination nodes of the single physical communication channel, and the other destination nodes of any one of the split subchannels may be different from the other destination nodes of any other one of the split subchannels. In addition, the single physical communication channel may be configured to route the data from the first node to any one of the other destination nodes in at most two hops.

The present disclosure may also generally relate to computer accessible mediums having stored thereon computer executable instructions for performing a procedure to route data across a multinodal network. For example, when the procedure is executed by a processing arrangement, the processing arrangement may be configured to perform techniques comprising retrieving data from the storage arrangement with the processing arrangement, and routing the data retrieved from the storage arrangement with a routing device from a first node to another destination node of a multinodal array through a single physical communication channel configured to route the data from the first node to at least two or more other destination nodes.

In other examples of computer accessible mediums, the single physical communication channel may comprise split subchannels, and each of the split subchannels may be configured to route the data to the other destination nodes of the single physical communication channel.

The present disclosure is not to be limited in terms of the particular examples described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which may, of course, vary. It is also to be understood that the terminology used herein is for the purpose of describing particular examples only, and is not intended to be limiting.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/ communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Directional terms such as horizontal or vertical are used for convenience to denote the layout of an array, but do not necessarily imply that the horizontal or vertical directions are ultimately oriented horizontally or vertically with respect to a horizon of a physical device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for routing data across a multinodal on-chip network, comprising:
a multinodal array having a plurality of nodes, including a first node; and
a plurality of physical communication channels extending along a first row of nodes in a horizontal direction of the array and along a second row of nodes in a vertical direction of the array so as to form a plurality of rows of physical communication channels, a first number of nodes from the plurality of nodes that are located along the first row being equal to a number of rows from the plurality of rows of physical communication channels that extend along the first row between the first number of nodes, and a second number of nodes from the plurality of nodes that are located along the second row being equal to a number of rows from the plurality of rows of physical communication channels that extend along the second row between the second number of nodes, the plurality of physical communication channels configured to connect the plurality of nodes, including a first physical communication channel connecting the first node with at least two of the plurality of nodes;
wherein the first physical communication channel is configured to route the data from the first node to the at least two of the plurality of nodes; and
wherein the plurality of physical communication channels are arranged to route data between the first node and any of the plurality of nodes, including nodes other than the at least two of the plurality of nodes, using a maximum of two hops on the plurality of physical communication channels.

2. The system of claim 1, wherein each of the plurality of nodes comprises two or more subnodes that are configured to share a routing device.

3. The system of claim 1,
wherein each of the plurality of nodes has two to four outputs and $2(k-1)$ inputs, wherein k is the number of nodes from the plurality of nodes located along a particular row of the array.

4. The system of claim 1, wherein at least one of the plurality of physical communication channels includes two or more split subchannels, wherein each of the split subchannels is configured to route the data to the other destination nodes of the respective one of the plurality of physical communication channels.

5. The system of claim 4, wherein the two or more split subchannels have approximately equal bandwidths and a sum of the bandwidths of the split subchannels is approximately equal to a bandwidth of the respective one of the plurality of physical communication channels.

6. The system of claim 1, wherein at least one of the plurality of physical communication channels includes two or more split subchannels that are configured to route the data to the other destination nodes of the first physical communication channel, wherein at least one of the split subchannels is configured to route the data from the first node to at least two of the other destination nodes of the respective one of the plurality of physical communication channels, and wherein the other destination nodes of any one of the split subchannels is different from the other destination nodes of any other one of the split subchannels.

7. The system of claim 1, wherein the system is configured as a single-chip multiprocessor.

8. A method for routing data across a multinodal on-chip network comprising:
- retrieving the data from a storage arrangement with a processing arrangement to provide the retrieved data; and
- routing the retrieved data with a routing device from a first node to another destination node of the multinodal network through a single physical communication channel configured to route the data from the first node to two or more other destination nodes;
- wherein the multinodal network includes a plurality of physical communication channels extending along a first row of nodes in a horizontal direction of the array and along a second row of nodes in a vertical direction of the array so as to form a plurality of rows of physical communication channels, a first number of nodes from the plurality of nodes that are located along the first row being equal to a number of rows from the plurality of rows of physical communication channels that extend along the first row between the first number of nodes, and a second number of nodes from the plurality of nodes that are located along the second row being equal to a number of rows from the plurality of rows of physical communication channels that extend along the second row between the second number of nodes, the plurality of physical communication channels arranged to route the data between the first node and any destination node using a maximum of two hops on the plurality of physical communication channels.

9. The method of claim 8, wherein each of the nodes comprises two or more subnodes that are configured to share a routing device.

10. The method of claim 8,
- wherein each of the plurality of nodes has two to four outputs and 2(k−1) inputs, wherein k is the number of nodes from the plurality of nodes located along a particular row of the array.

11. The method of claim 8, wherein at least one of the physical communication channels comprise split subchannels having approximately equal bandwidths, wherein each of the split subchannels is configured to route the data to the other destination nodes of the single physical communication channel.

12. The method of claim 11, wherein a sum of the bandwidths of the split subchannels approximately equals a bandwidth of the single physical communication channel.

13. The method of claim 8, wherein the single physical communication channel comprises two or more split subchannels that are configured to route the data to the other destination nodes of the single physical communication channel, wherein at least one of the split subchannels is configured to route the data from the first node to at least two of the other destination nodes of the single physical communication channel, and wherein the other destination nodes of any one of the split subchannels is different from the other destination nodes of any other one of the split subchannels.

14. A non-transitory computer accessible medium having stored thereon computer executable instructions for performing a procedure to route data across a multinodal on-chip network, wherein, when the procedure is executed by a processing arrangement, the processing arrangement is configured to perform techniques comprising:
- retrieving the data from a storage arrangement with the processing arrangement; and
- routing the data retrieved from the storage arrangement with a routing device from a first node to another destination node of the multinodal network through a single physical communication channel configured to route the data from the first node to at least two or more other destination nodes;
- wherein the multinodal network includes a plurality of physical communication channels extending along a first row of nodes in a horizontal direction of the array and along a second row of nodes in a vertical direction of the array so as to form a plurality of rows of physical communication channels, a first number of nodes from the plurality of nodes that are located along the first row being equal to a number of rows from the plurality of rows of physical communication channels that extend along the first row between the first number of nodes, and a second number of nodes from the plurality of nodes that are located along the second row being equal to a number of rows from the plurality of rows of physical communication channels that extend along the second row between the second number of nodes, the plurality of physical communication channels arranged to route the data between the first node and any destination node using a maximum of two hops on the plurality of physical communication channels.

15. The non-transitory computer accessible medium of claim 14, wherein the single physical communication channel comprises split subchannels, wherein each of the split subchannels is configured to route the data to the other destination nodes of the single physical communication channel.

* * * * *